United States Patent [19]
Bertorelli et al.

[11] 3,879,527

[45] Apr. 22, 1975

[54] ALKALI METAL POLYSILICATES AND THEIR PRODUCTION

[75] Inventors: Orlando L. Bertorelli; Robert K. Mays, both of Havre de Grace; Lloyd E. Williams, Bel Air, all of Md.; Howard F. Zimmerman, Jr., Athens, Tenn.

[73] Assignee: J. M. Huber Corporation, Locust, N.J.

[22] Filed: Oct. 28, 1971

[21] Appl. No.: 193,484

[52] U.S. Cl. ............... 423/332; 252/135; 423/334; 423/265
[51] Int. Cl. ............................................ C01b 33/32
[58] Field of Search ........... 423/332, 333, 334, 265, 423/512, 544; 252/135

[56] References Cited
UNITED STATES PATENTS

| | | | |
|---|---|---|---|
| 1,111,918 | 9/1914 | Paterson | 423/334 |
| 1,139,741 | 5/1915 | Vail et al. | 423/265 X |
| 1,198,203 | 9/1916 | Edgerton | 423/334 |
| 1,517,891 | 12/1924 | Dickerson | 423/332 |
| 2,357,723 | 9/1944 | Beecher et al. | 423/334 |
| 2,881,049 | 4/1959 | Erbe et al. | 423/332 |

FOREIGN PATENTS OR APPLICATIONS

| | | | |
|---|---|---|---|
| 203,749 | 9/1923 | United Kingdom | 423/333 |

*Primary Examiner*—Edward J. Meros
*Attorney, Agent, or Firm*—Harold H. Flanders; Donald S. Lilly

[57] ABSTRACT

A method for producing alkali metal polysilicate complexes and their use as builders in detergents is disclosed. The polysilicates are produced by hydrothermally reacting, under certain controlled conditions, an aqueous dispersion of finely-divided silica, an alkali metal hydroxide and a sulfate salt of an alkali metal. The synthesized reaction mixture is then spray dried and the solid product fractured, pulverized and agitated in a rotating drum to form a product having particularly advantageous properties. The products of the invention can be used in adhesives, in the production of silica gel, in textiles and the like. However, their use as builders in detergents and in combination with known anionic, nonionic and amphoteric surface active compounds (surfactants) is disclosed and claimed.

3 Claims, 5 Drawing Figures

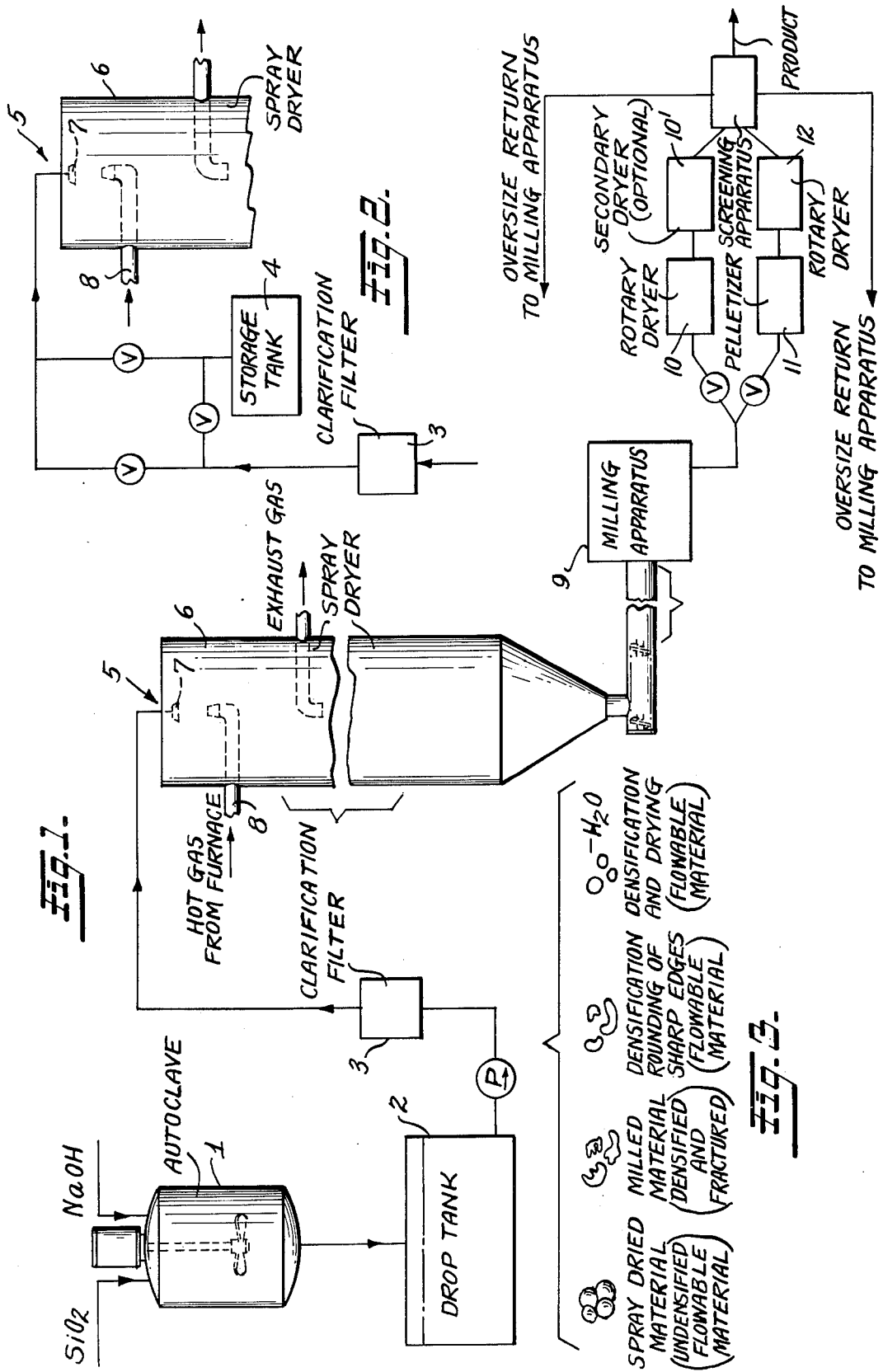

018
ALKALI METAL POLYSILICATES AND THEIR PRODUCTION

BACKGROUND OF THE INVENTION

1. Field of the Invention

This invention relates to the production of alkali metal silicates and more particularly to a unique process for producing alkali metal polysilicates that may be used as builders in detergents.

2. Description of the Prior Art

As known in the art, alkali silicates can be manufactured by the so-called "fusion" process wherein a mixture of sand and an alkali metal salt are fused at temperatures sufficiently high to volatilize the acid radical of the salt used. The "glass" thus produced is then cooled and dissolved in water, usually at elevated temperatures and pressures, to yield a product suitable for commercial use. For use in detergents, such silicates are conventionally converted into the hydrated solid form by concentrating the solution, removing the silicates by crystallization and thereafter drying the crystals.

A further known method for producing silicates is the "wet digestion" method wherein a solution of finely divided silica, rendered soluble by digestion with a concentrated solution of caustic alkali, is evaporated and cooled to a suitable crystallization temperature.

Examples of the above and further techniques for producing alkali metal silicates are disclosed in U.S. Pat. Nos. 2,161,515; 2,282,018; 2,357,723 and 3,271,317.

In this regard, and again as is well known in the art, detergent compositions conventionally contain a detergent compound i.e., a surfactant and a "builder," the latter serving in part, to increase the effectiveness of the detergent component. While phosphate compounds such as sodium tripolyphosphate, have been used somewhat extensively as builders in detergents for many years, the use of other inorganic salts including alkali metal silicates, carbonates, borates and the like is known. An example of built detergent compositions disclosing the use of the above noted inorganic materials is disclosed in U.S. Pat. No. 3,392,121 which issued July 9, 1968 to Gedge.

SUMMARY OF THE INVENTION

Stated broadly, the present invention is directed to the production of alkali metal polysilicates which may be used directly in detergents and as replacement for polyphosphates. The products of the invention when used in detergent formulations yield compositions with at least equal detergency with formulations containing phosphates and thus are superior to known silicate or other inorganic salt "builders."

In summary, the unique polysilicates of the present invention are produced by the hydrothermal treatment of a dispersion or suspension of silica, an alkali metal hydroxide and a sulfate salt of an alkali metal. The reaction mixture, upon completion of the hydrothermal synthesis, is spray dried, milled and further processed in a unique manner, as will be described in detail hereinafter, to produce polysilicates having particularly advantageous properties. The products of the invention, which may also be used in the production of adhesives, silica gel, in textiles, water treatment and the like, have polysilicate ions in a highly polymerized, irreversible state.

It is accordingly a general object of this invention to provide a new and improved process for producing alkali metal polysilicates.

Another and more particular object is to provide an improved product, and a process for preparing same, said product comprising alkali metal polysilicates having polysilicate ions in a highly polymerized, irreversible state that are functional in the replacement of polyphosphates in detergents.

Yet another object is to provide a new and improved process for producing polysilicates by the hydrothermal reaction of finely divided silica, a caustic alkali and a sulfate salt of an alkali metal.

Still another object of the invention is to provide an improved process comprising the hydrothermal synthesis of alkali metal polysilicates and the further processing of the synthesized product in a manner such that the final product has a relatively high density, low moisture content, and may be used as a direct replacement for phosphates in detergents. Yet still another object is to provide a new and improved process for producing polysilicates, said process providing high flexibility in the production of polysilicates having given or predetermined properties.

The manner in which the foregoing and other objects are achieved in accordance with the present invention will be better understood in view of the following detailed description and accompanying drawings, which form a part of the specification and wherein:

FIG. 1 is a diagrammatic illustration, shown in elevation, of a suitable arrangement of apparatus for carrying out a particularly advantageous method embodiment of the present invention.

FIG. 2 is a diagramatic illustration shown in elevation of a further apparatus embodiment that may be used in the practice of the present invention.

FIG. 3 is a pictorial illustration of the product produced in accordance with the present invention; said product being shown at the various post-processing steps of the present invention.

DESCRIPTION OF PREFERRED EMBODIMENT(S)

Figure 4:
FIG. 4 is a photomicrograph of the product produced in accordance with the present invention.

As disclosed in detail in applicant's U.S. Ser. No. 193,485, filed Oct. 28, 1971, it has been discovered that alkali metal polysilicates having particularly desired and predetermined properties, can be produced by hydrothermally reacting or digesting, under certain controlled conditions, an aqueous suspension of finely divided silica and a caustic alkali; spray drying the resulting reaction mixture and thereafter fracturing, pulverizing and agitating the spray dried product to form particles having continuously even surfaces.

In accordance with the teachings of the aforementioned application, an aqueous suspension or dispersion of finely divided silica ($SiO_2$) and an alkali hydroxide, e.g., sodium hydroxide, are subjected to hydrothermal treatment for a period of time sufficient to transform the reactants into alkali metal silicates that are at least partially polymerized and which, as stated above, contain polysilicate ions in a polymerized, irreversible state.

As taught in said application, the term finely-divided silica refers to a finely divided powder containing at least 99% $SiO_2$ and having a particle size at least 95% of which are no larger than 75 microns. Silica powders, referred to in the art as "silica flour" or its equivalent are suitable.

The alkali metal hydroxide employed in the present invention is preferably sodium hydroxide (NaOH). However, other alkali metal hydroxides, i.e., metals of Group Ia of the Periodic Table may be employed. These include potassium, lithium, rubidium, cesium and francium hydroxide.

As briefly discussed above, the present invention is based on the unexpected discovery that alkali metal silicates can be advantageously produced by the inclusion of a sulfate salt in the reaction mass during the hydrothermal synthesis of polysilicates. The products produced in this manner, i.e., salt induced polymerization, have particularly advantageous properties. The sulfate apparently serves as a promoter or catalyst for the polymerization as well as forming a complex with the polysilicate thus produced.

At this point it may be noted, and as is generally known in the art, alkali metal silicates having a silica to sodium oxide weight ratio ($SiO_2/Na_2O$) on the order of about 1.5:1 are in simple ionic form. As indicated, the present invention is directed to a process for making an alkali metal polysilicate that is at least partially polymerized. Therefore the concentration of the silica and the alkali metal hydroxide is critical to the extent that said concentrations must be such that the $SiO_2/Na_2O$ weight ratio of the product is at least 1.8:1. It has been discovered that products having $SiO_2/Na_2O$ weight ratios of from about 1.8 to 2.7 are particularly advantageous. Thus in the preferred practice of the present invention and when employing NaOH (expressed as $Na_2O$) as the alkali metal hydroxide, the initial composition of the silica and hydroxide (on a dry basis) is from about 64 to 74 percent by weight $SiO_2$ and from about 36 to 26 percent by weight $Na_2O$. The amount of water employed is critical to the extent that the reaction mixture must be fluid. Also it has been found that very dilute reaction mixtures effect a substantial decrease in the rate of reaction. Preferably, the weight percent of the water based on the total weight of the reaction mixture, is from about 20 to 60 percent.

The concentration of the sulfate salt in the aqueous reaction mixture should be within the range of 2 to 15% by weight, based on the weight of the water. The preferred range is from 2.5 to 11%. If added in the above noted quantities, a product is produced having a sulfate content, on a theoretical basis, of from 5 to 25% by weight.

As will be described in more detail hereinafter, the hydrothermal treatment of the aqueous dispersion of finely divided silica, alkali metal hydroxide and sulfate salt is effected in a closed vessel at temperatures above the boiling point of the aqueous suspension being treated and under the elevated pressures obtained at such temperatures. Any suitable pressurized equipment, provided with means for maintaining the aqueous mixture under high agitation and provided with means (e.g., a steam jacket) for maintaining the dispersion at the desired temperatures and pressures, may be employed.

In this regard, the hydrothermal treatment of the silica/caustic/sulfate salt dispersion may be conducted at temperatures in the range of from about 280°F to 410°F and corresponding pressures of about 65 psig to 290 psig, respectively. Preferred temperature ranges are from 310°F to 350°F. The reaction time is a function of the temperature employed. Reaction periods on the order of about 2.5 – 4.5 hours are required for the above identified temperature ranges, it being of course understood that higher temperatures result in reduced reaction times.

Turning now to the more specific details of the invention and with reference first to FIG. 1, an alkali metal hydroxide, such as sodium hydroxide, preferably in the form of a concentrated solution containing at least 50% NaOH, is charged to an agitated reaction vessel indicated generally at 1. Thereafter the finely-divided silica is charged to the reaction vessel.

Preferably, the silica is introduced as an aqueous slurry containing the water and sulfate salt. That is, an aqueous solution of the sulfate is first prepared, with the silica then being added to the solution. However, the silica can be introduced as a solid or as a separate slurry of silica and water. The sulfate can also, of course, by introduced into or charged to the reactor in solid form.

Suitable means are provided in the reactor for maintaining the aqueous dispersion under constant agitation during the charging as well as the reaction period. If desired, the concentrated caustic solution may be preheated to the reaction temperature prior to the introduction of the silica slurry. If the caustic solution is not preheated, the aqueous solution containing said reactants is initially preheated to that temperature at which the hydrothermal synthesis is to be conducted. The reaction mixture is maintained at the pre-selected reaction temperature, again while maintaining same under continuous agitation, for a period of time to effect substantially complete transformation of the silica, hydroxide and sulfate salt into the alkali metal polysilicate-sulfate complex of the present invention.

At the end of the reaction period, the reaction vessel is vented and the mixture is passed, preferably by gravity, into a drop tank 2 which contains dilution water at approximately room or ambient temperatures. In this manner the temperature of the reaction mixture is cooled quickly and efficiently and the weight ratio of the reaction product to water adjusted to the concentration required for the spray drying of the product as described hereinbelow.

The aqueous mixture in the drop tank is preferably passed through a clarification filter 3 to remove small quantities of insolubles, such as sand, unreacted silica and the like. As illustrated in the embodiment shown in FIG. 2, the clarified aqueous mixture may then be passed into a hold or storage tank 4, or fed directly into the upper portion of a spray dryer, indicated generally at 5.

With reference to FIG. 1, the aqueous mixture is introduced into the upper portion of the generally upright or vertical, cylindrical chamber 6 of the spray dryer 5 and passes through a rotating wheel or spray nozzle 7. The latter causes the aqueous mixture to be finely and evenly dispersed within said chamber and in direct contact with a mass of upwardly directed hot gas, i.e., air, introduced through conduit means 8. Suitable control valves (not shown) may be provided for regulating the rate of feed of the reaction mixture, as well as that of the upwardly directed air, into the spray dryer. The spray drying is preferably effected at relatively high temperatures, with particularly advantageous inlet air temperatures being on the order of from about 400°F to 1,000°F. In this manner, the "flashing off" of the water in the spray dryer is effected rapidly with the resultant spray dried droplets being in the form of hollow microspheres.

Turning now to the details of the post-processing techniques employed in the practice of the present invention, the spherical polysilicate droplets are collected at the bottom of the spray dryer and fed (as by a screw conveyor) into a suitable milling apparatus 9 which serves to fracture and pulverize the hollow spheres so that the density of the resulting fractured particles is increased to at least 25 lbs/cubic foot.

The fractured and pulverized particles are next passed into a rotating drum or cylinder 10 which serves to reduce the surface irregularities of the fractured particles and to form a product having continuously even surfaces.

In this regard the temperature of the fractured particles in the rotary drum is preferably in the range of from 70° to 140°C. At a temperature on the order of about 70°C or higher, the particles become somewhat plastic in nature. It has been found that this characteristic is preferable in obtaining the desired reduction of the surface irregularities of the particles, i.e., obtaining a product having continuously even surfaces.

The rotary drum or apparatus is thus preferably a rotary dryer which serves the dual function of effectively reducing the surface irregularities as well as reducing the moisture content of the product to a desired level. A single rotary dryer is sufficient to reduce the moisture content of the product to approximately 18%. However, additional secondary rotary dryers may be employed if required. The dried product may be passed through suitable screening apparatus to produce a product having a desired particle size or range. In accordance with U.S. Ser. No. 193,471, filed Oct. 28, 1971, and again with reference to FIG. 1, the fractured and pulverized product from the milling apparatus may alternately be fed into a pelletizer, indicated generally at 11, and then into a secondary dryer 12. While the apparatus employed in the post-processing techniques of the invention e.g., mills, rotary dryers, screening apparatus, etc. are well known per se, the sequence steps disclosed herein are unique to the extent that polysilicate products having particularly desirable properties, i.e., a percent moisture content of less than 20 percent, a density on the order of 40–46 lbs/cubic foot and a particle size of minus 14 plus 65 mesh (Tyler screen size), can be produced from a high temperature spray dried product.

As briefly noted above, the present invention is based on the unexpected discovery that the inclusion of a sulfate salt in the reaction mixture, during the hydrothermal synthesis of the polysilicate, improves the stability of the reaction mixture and enhances the polymerization thereof. While not intending to be bound by any particular theory, it is believed that the sulfate serves as a promoter or catalyst for the polymerization and also forms a complex with the alkali metal polysilicate thus produced. It has also been uniquely discovered that products produced in this manner, i.e., salt induced polymerization, have particularly advantageous properties, again for reasons not fully understood, as builders in detergents.

In practicing this preferred embodiment of the invention, the sulfate salt is preferably included in the silica slurry prior to its introduction into the reaction vessel 1. As used herein the term sulfate salt refers to a sulfate salt of an alkali metal, such as sodium, potassium, etc. as set forth above. The sulfate salt also as discussed above, may be added to the reaction vessel in amounts such that, on a theoretical basis, same would constitute from about 5 to 25% by weight of the spray dried product.

As will be readily appreciated by those skilled in the art, the unique process of the present invention may be carried out batchwise or on a semi-continuous or continuous basis. As known, continuous or semi-continuous processes involve a continuous mixing operation in which the reactants, i.e., the silica and sodium hydroxide, are continuously proportioned into a suitable reaction vessel, the reaction mixture then being continuously discharged therefrom. Since the reaction time of the present invention is on the order of 2.5 – 4.5 hours a continuous operation would generally require a number of reactors or autoclaves in series so that the required retention time could be established. Alternately an elongated tubular reactor, provided with suitable baffles, heat transfer means, etc., could be designed.

Before turning to specific Examples of the present invention, and again as briefly discussed above, the unique alkali metal polysilicates of the present invention have particular utility for use as builders in detergent compositions. Thus an important object of the invention is to provide a detergent composition comprising a surfactant and, as a builder, the novel polysilicates of the present invention, the latter being employed as a direct replacement for polyphosphates. In this regard, the builder of the invention may be used with any of the conventional detergent classes, i.e., synthetic non-soap anionic, nonionic and/or amphoteric surface active compounds which are suitable as cleansing agents. Anionic surface active compounds can be broadly described as compounds which contain hydrophilic or lyophilic groups in their molecular structure and which ionize in an aqueous medium to give anions containing the lyophilic group. These compounds include the sulfated or sulfonated alkyl, aryl and alkyl aryl hydrocarbons and alkali metal salts thereof, for example, sodium salts of long chain alkyl sulfates, sodium salts of alkyl naphthalene sulfonic acids, sodium salts of sulfonated abietenes, sodium salts of alkyl benzene sulfonic acids particularly those in which the alkyl group contains from 8–24 carbon atoms; sodium salts of sulfonated mineral oils and sodium slats of sulfosuccinic acid esters such as sodium dioctyl sulfosuccinate.

Advantageous anionic surfactants include the higher alkyl aryl sulfonic acids and their alkali metal and alkaline earth metal salts such as for example sodium dodecyl benzene sulfonate, sodium tridecyl sulfonate, magnesium dodecyl benzene sulfonate, potassium tetradecyl benzene sulfonate, ammonium dodecyl toluene sulfonate, lithium pentadecyl benzene sulfonate, sodium dioctyl benzene sulfonate, disodium dodecyl benzene disulfonate, disodium di-isopropyl naphthalene disulfonate and the like as well as the alkali metal salts of fatty alcohol esters of sulfuric and sulfonic acids, the alkali metal salts of alkyl aryl (sulfothiotic acid) ethers and the alkyl thiosulfuric acid, etc.

Nonionic surface active compounds can be broadly described as compounds which do not ionize but usually acquire hydrophilic characteristics from an oxygenated side chain, such as polyoxyethylene, while the lyophilic part of the molecule may come from fatty acids, phenols, alcohols, amides or amines. Examples of nonionic surfactants include products formed by condensing one or more alkylene oxides of 2 to 4 carbon atoms, such as ethylene oxide or propylene oxide, preferably ethylene oxide alone or with other alkylene oxides, with a relatively hydrophobic compound such as a fatty alcohol, fatty acid, sterol, a fatty glyceride, a fatty amine, an aryl amine, a fatty mercaptan, tall oil, etc. Nonionic surface active agents also include those products produced by condensing one or more relatively lower alkyl alcohol amines (such as methanolamine, ethanolamine, propanolamine, etc.) with a fatty acid such as lauric acid, cetyl acid, tall oil fatty acid, abietic acid, etc. to produce the corresponding amide.

Particularly advantageous nonionic surface active agents are condensation products of a hydrophobic compound having at least 1 active hydrogen atom and a lower alkylene oxide (for example the condensation product of an aliphatic alcohol containing from about 8 to about 18 carbon atoms) and from about 3 to about 30 mols of ethylene oxide per mol of the alcohol, or the condensation product of an alkyl phenol containing from about 8 to about 18 carbon atoms in the alkyl group and from about 3 to about 30 mols of ethylene oxide per mol of alkyl phenol. Other advantageous nonionic detergents include condensation products of ethylene oxide with a hydrophobic compound formed by condensing propylene oxide with propylene glycol.

Amphoteric surface active compounds can be broadly described as compounds which have both anionic and cationic groups in the same molecule. Such compounds may be grouped into classes corresponding to the nature of the anionic-forming group, which is usually carboxy, sulfo and sulfato. Examples of such compounds include sodium N-coco beta amino propionate, sodium N-tallow beta amino dipropionate, sodium N-lauryl beta iminodipropionate and the like.

Other typical examples of these categories of the anionic, nonionic and/or amphoteric surface active agents are described in Schwartz and Perry "Surface Active Agents" Interscience Publishers, New York (1949) and the Journal of American Oil Chemists Society, volume 34, No. 4, pages 170–216 (April 1957) which are incorporated herein by reference.

The amount of polysilicate builder necessary to be used with the surface active compound (active) may vary depending upon the end use, type of active employed, pH conditions and the like. In general, the builders can be employed in detergent compositions in any desired proportions. The optimum active/builder ratio depends upon the particular active employed and the end use for which the detergent composition is intended but most generally will fall within the range of active/builder weight ratio of about 10:1 to 1:10 and preferably about 4:1 to 1:4.

Detergent compositions produced in accordance with the present invention can be prepared in any of the commercially desirable composition forms such as bar, granular, flake, liquid and tablet form. It should be understood that the present invention is not limited to any particular method for preparing the detergent compositions containing the builder and the surfactant. Such techniques are well known in the industry. Thus, e.g., the builder may be mechanically mixed in the surfactant in the form of a slurry or dissolved in a solution of the surfactant. Additionally, the builder may be admixed with the surfactant in any of the forms in which the surfactant is manufactured.

The invention will be further illustrated by the following examples which set forth particularly advantageous method and composition embodiments. While the examples prove to illustrate the present invention they are not intended to limit it thereto.

PREPARATION OF ALKALI-METAL POLYSILICATES

EXAMPLE 1

9,476 lbs. of a 50% NaOH solution was charged to a stainless steel autoclave provided with means for continuously agitating the solution. An 11% sulfate solution was prepared by adding 626 pounds of $Na_2SO_4$ to 5,054 pounds of water. 9,269 pounds of silica flour was added to the aqueous sulfate salt solution and the slurry was then charged to the autoclave. The autoclave was sealed and the temperature of the aqueous mixture preheated (by the introduction of steam into an exterior steam jacket) to 315°F (100 psig) over a 1-hour period. The reaction mixture was thereafter maintained at this temperature for three hours. Continuous agitation was maintained throughout the heat up and reaction period. At the end of the three hour reaction cycle, the steam was shut off and the autoclave partially vented to reduce the pressure to about 60 psig. The vent was then fully opened, the pressure in the autoclave being reduced to 20 psig. At this time a bottom outlet valve of the autoclave was opened and the reaction mixture fed by gravity into a drop tank positioned beneath the autoclave and containing 15,144 lbs. of $H_2O$ at 77°F. The mixture in the drop tank was pumped through a clarification filter and introduced into the upper portion of a spray dryer of the type illustrated in FIG. 1. The aqueous mixture was fed into the spray dryer at a rate of 21,100 lbs. per hour, the concentration of the mixture comprising 4 lbs. of the sodium polysilicate-sulfate complex per gallon. The speed of the spray wheel or nozzle was about 11,000 rpm. The spray dryer inlet and outlet air temperatures were 600°F and 220°F respectively. The spray dried product was collected and withdrawn from the base of the spray dryer by a screw conveyor and passed into a high impact mill which fractured and pulverized the spherical particles. In this Example 12, 500 lbs. of sodium polysilicate-sulfate complex, having a $SiO_2/Na_2O$ weight ratio of 2.5:1 and a density of 26 pounds/ft$^3$ was recovered from the spray dryer. The milling operation increased the density of the product to about 38 pounds/ft$^3$. The product was next passed into a rotary dryer which reduced the moisture content of the polysilicate particles from about 25% to about 18%. In addition it was found that the tumbling action of the rotary dryer had the effect of rounding off the sharp edges of the fractured particles from the milling action so that the particles had continuously even surfaces. The fact that the product produced in this Example was partially polymerized was established by conductivity tests as determined by the Harman technique (R. W. Harman, *Journal of Physical Chemistry* 32, 44 – 60 (1928).

Figure 5:
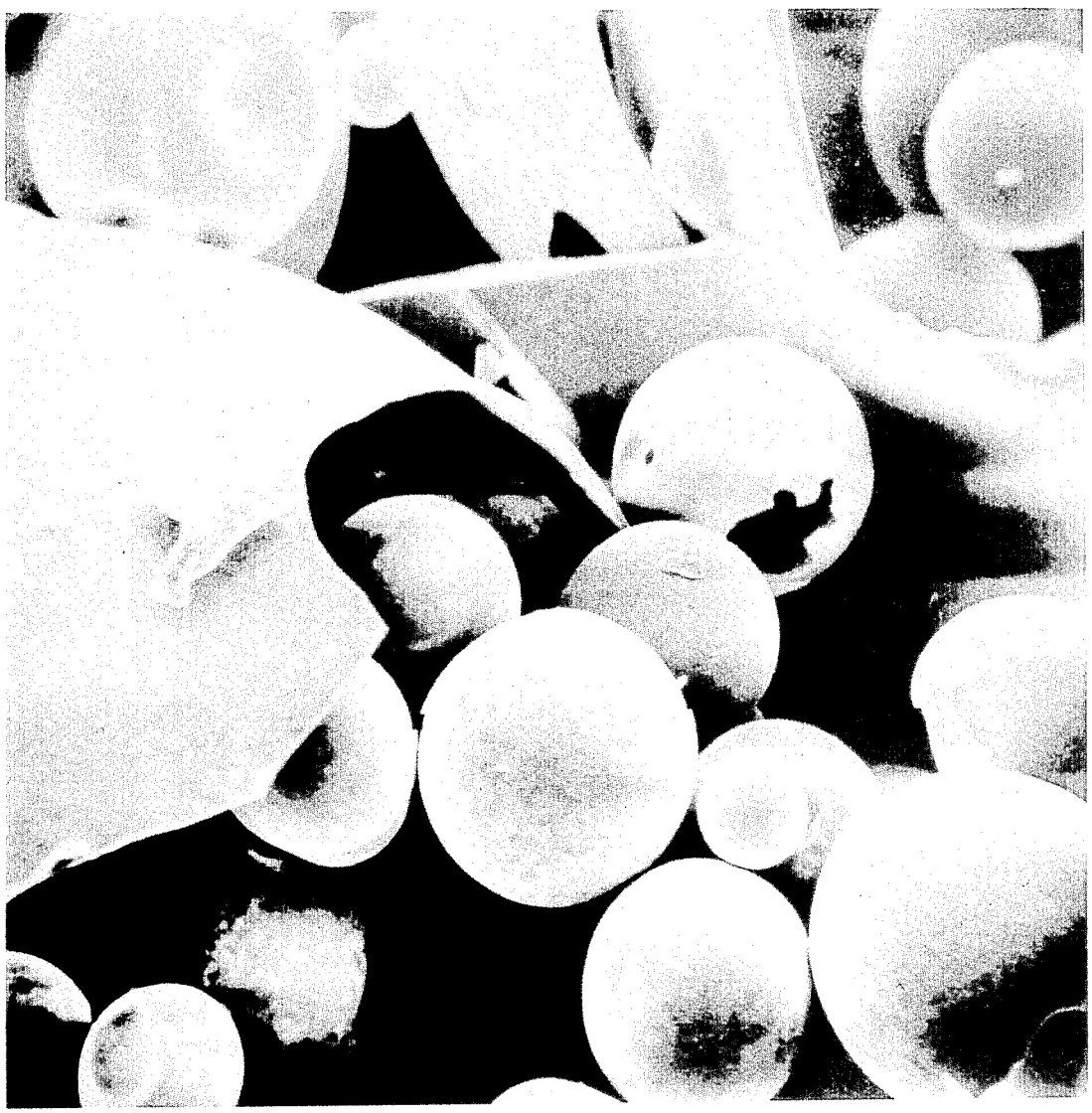
FIG. 5 is a photomicrograph of a product produced by the hydrothermal synthesis of silica and sodium hydroxide, without the inclusion of a sulfate salt as disclosed in the present application.

FIG. 4 shows the spray dried product of the present invention, as produced in this Example. The spray dried spherical particules have been partially fractured to show the internal structure of the product. FIG. 4 remarkably illustrates the distinction of the product of the present invention as compared to a product produced without the addition of the sulfate salt as shown in FIG. 5.

EXAMPLE 2

The procedure of Example 1 was repeated except that the temperatures and pressures of the hydrothermal reaction were varied in a series of Examples as shown by the following table.

TABLE 1

| Run No. | Temp. (°F) | Pressure (psig) | Reaction Time (minutes) |
|---|---|---|---|
| 1 | 260 | 50 | 270 |
| 2 | 280 | 64 | 240 |
| 3 | 320 | 104 | 180 |
| 4 | 350 | 149 | 175 |
| 5 | 380 | 210 | 160 |
| 6 | 410 | 290 | 150 |

The products obtained in these Examples or Runs were the same as that obtained in Example 1 and established that an increase in the temperature and pressure increased the rate of the hydrothermal synthesis. Further hydrothermal reactions, conducted at temperatures below 260°F established that little polysilicate transformation was effected even for reaction periods on the order of 10 hours or longer.

EXAMPLE 3

In this Example the general procedures of Examples 1 – 2 were repeated except that, in a series of tests conducted on a bench or laboratory scale basis, potassium, lithium, and cesium hydroxide were substituted for the sodium hydroxide. In these tests, to save time and expense, small quantities of the reactants, e.g., 132.6 grams potassium hydroxide, 92.69 grams silica flour and 50.54 grams of $H_2O$ were employed in laboratory equipment. However, these tests produced products having properties substantially the same as the product of Example 1.

EXAMPLE 4

In a series of tests the procedures of Example 1 was repeated except that the quantities of reactants in the hydrothermal treatment were varied as indicated below.

TABLE 2

| Run No. | Wt. % $SiO_2$ | Wt. % NaOH | Wt. % $H_2O$ | Product Obtained $SiO_2/Na_2O$ Wt. Ratio |
|---|---|---|---|---|
| 1 | 39.0 | 21.6 | 39.4 | 2.3 |
| 2 | 42.5 | 17.7 | 39.8 | 2.5 |
| 3 | 43.4 | 16.6 | 40.0 | 2.6 |
| 4 | 43.8 | 16.2 | 40.0 | 2.7 |
| | Reactants $SiO_2$/NaOH Wt. % | | $Na_2SO_4/H_2O$ Wt. % | % Sulfate in Product on theoretical basis |
| 5 | 2.4 | | 2.7 | 5% |
| 6 | 2.4 | | 5.5 | 10% |
| 7 | 2.4 | | 8.2 | 15% |

In order to illustrate the use of the unique polysilicates, produced in accordance with the present invention, as builders in detergents, a polysilicate builder was compared under carefully controlled conditions, with sodium tripolyphosphate, sodium carbonate and a conventional sodium silicate. To obtain as accurate a measurement as possible of the builder properties of each of the compounds, none of the usual additives, such as fabric softeners, were used in the following tests. The tests were made in a Terg-O-Tometer machine on standard soiled fabric specimens. The surfactant employed was sodium dodecylbenzene sulfonate with a 1:2.6 ratio of surfactant to builder. The test results are as shown in Table 3 below.

The above results indicate that the polysilicate builder of the present invention compares very favorably with sodium tripolyphosphate and is superior to conventional sodium silicates and sodium carbonates. Further and as will be readily appreciated by those skilled in the art, the low ratio ($SiO_2/Na_2O$) silicates currently commercially available are relatively expensive and are often not available in dry form because of high production cost and solubility factors common to e.g., "glass" furnace (fusion) silicate processes.

Thus it will be seen that the present invention provides a truly unique and simplified process for produc-

TABLE 3

| Builder | % Ash | Builder Only % Reflectance | % Soil Removal | Builder in Formulation % Ash | % Reflectance |
|---|---|---|---|---|---|
| Unsoiled Cloth | 0.04 | 100.0 | — | 0.04 | 100 |
| STPP (1) | 0.03 | 97.3 | 35 | 0.13 | 99.7 |
| (2) | 0.05 | 97.1 | 35 | 0.06 | 99.4 |
| $Na_2CO_3$ (1) | 1.19 | 94.3 | 26 | 0.71 | 94.6 |
| (2) | 1.19 | 94.4 | 25 | 0.66 | 95.5 |
| Known Sodium Silicates | | | | | |
| (1) | 0.37 | 98.7 | 30 | 0.37 | 98.7 |
| (2) | 0.37 | 98.6 | 30 | 0.37 | 98.6 |
| Polysilicates of Invention Products of | | | | | |
| Example 1 | 0.05 | 98.5 | 35 | 0.13 | 99.0 |
| Example 2 | 0.03 | 98.6 | 35 | 0.13 | 99.5 |
| Example 5 Runs (1) | 0.18 | 98.5 | 35 | 0.13 | 99.0 |
| (3) | 0.08 | 98.5 | 35 | 0.13 | 98.9 |
| (5) | 0.06 | 98.6 | 35 | 0.13 | 99.1 |
| (7) | 0.05 | 98.6 | 35 | 0.13 | 99.3 | ing alkali metal polysilicates that have particular use as builders in detergents. The process of the invention permits high flexibility in the production of a product of any given or desired properties yet at the same time permits the use of standard chemical equipment such as rotary dryers, pelletizers and the like. In this regard, e.g., pelletization has been carried out for many years by known techniques and apparatus. Two extensively used pelletizing apparatus include the rolling drum and the pin mixer. The rolling drum uses dry material while the pin mixer is a wet method employing water and suitable binding agents. It should be readily apparent that either technique could be employed in the present invention. Also the nature of the rotary dryer is not critical. That is, a countercurrent or concurrent direct-contact air-heated dryer including a rotating drum or shell supported on suitable rollers or an indirect fire-heated rotary dryer having internal baffles or flights which lift the solids and shower them down through the interior of the shell, may be used. Such apparatus are well known in the art, being discussed in detail e.g., in Perry's "Handbook of Chemical Engineering." The spray dried product, in the form of tiny spherical particles, are preferably fractured, as discussed above, by an impact mill. In this type of apparatus, the mixing and pulverizing of the solids is done by blades or knives set in a helical pattern on a horizontal shaft turning in an open trough or closed cylinder. However, other milling type apparatus such as so-called mixing rolls (wherein solids are subjected to intense shear by being passed through metal rolls turning at different speeds) may be used.

As used herein "detergent(s)" refers to washing compositions in general including laundry detergents, dishwashing compounds and related materials. The term "agitating" as used herein refers to subjecting the particles to motion, most commonly tumbling motion to reduce surface irregularities and/or agglomerate. The range of polysilicate composition obtainable is controlled by reactor charge and includes $SiO_2/Na_2O$ weight ratios of 1:1 to 2.6:1, preferably in the range 2:1 to 2.4:1. An important characteristic of these products is the controlled hydration which affects solubility and hence the functional utility of these products in detergency applications.

Density, particle sizes, particle shape and size distribution, and materials handling properties are important characteristics of the products of the present invention which may control these properties over a broad range. For example density may be varied from 0.4 g/cc (25 lbs/ft$^3$) to in excess of 0.96 g/cc (60 lbs/ft$^3$) while maintaining a size distribution of 15% maximum on a 65 mesh screen. It is also possible to produce the above mentioned density range but vary the size distribution so that substantially 100% of the particles are retained on a 65 mesh screen. The product of the present invention may be incorporated into detergent compositions as a pre-drying or post-drying additive.

Although a specific preferred embodiment of the present invention has been described in the detailed description above, the description is not intended to limit the invention to the particular forms or embodiments disclosed herein, since they are to be recognized as illustrative rather than restrictive and it will be obvious to those skilled in the art that the invention is not so limited. The invention is declared to cover all changes and modifications of the specific example of the invention herein disclosed for purposes of illustration, which do not constitute departures from the spirit and scope of the invention.

What is claimed is:

1. A method for producing alkali metal polysilicates, said method comprising the steps of hydrothermally reacting an aqueous dispersion consisting essentially of finely divided silica, an alkali metal sulfate and an alkali metal hydroxide at a temperature in the range of from 280°F to 410°F and for a period of at least 2.5 hours, said dispersion comprising said silica and said alkali metal hydroxide having a silica to alkali metal oxide weight ratio of at least 1.8:1; said sulfate being present in said dispersion in an amount of from about 2 to 15% by weight based on the weight of the water; filtering said reaction mixture to remove insolubles, passing said reaction mixture into the upper portion of a drying chamber and dispersing said mixture in the form of fine droplets in the upper portion of said drying chamber; contacting said droplets with a mass of upwardly directed air at a temperature of at least 400°F, fracturing and pulverizing the spray dried product so that the density of the resulting fractured particles is at least 30 pounds per cubic foot; agitating said particles while maintaining said particles at a temperature of at least 70°C to round off the sharp edges of the fractured particles; contacting said particles with a mass of air at a temperature sufficient to reduce the moisture content of said particles to less than 25 percent and recovering the resulting product.

2. The method in accordance with claim 1 wherein the alkali metal hydroxide is sodium hydroxide and the alkali metal sulfate is sodium sulfate.

3. An alkali metal polysilicate that may be used as builders in detergents, said polysilicate comprising the spray dried and pulverized product obtained by hydrothermally reacting an aqueous mixture of finely divided silica, an alkali metal hydroxide and from about 2 to 15% by weight based on the weight of the water of an alkali metal sulfate salt in accordance with the method of claim 1; said polysilicate having polysilicate ions in a highly polymerized, irreversible state and having a $SiO_2/Na_2O$ weight ratio in the range of from 1.8:1 to 2.7:1, a density in the range of from 30 to 60 pounds per cubic foot and a moisture content less than 25 percent.

* * * * *

UNITED STATES PATENT OFFICE
CERTIFICATE OF CORRECTION

PATENT NO. : 3,879,527
DATED : April 22, 1975
INVENTOR(S) : Orlando L. Bertorelli; Robert K. Mays; Lloyd E. Williams; Howard F. Zimmerman, Jr.

It is certified that error appears in the above-identified patent and that said Letters Patent are hereby corrected as shown below:

Column 10, lines 24 through 35 should follow "Table 3".

Signed and Sealed this twenty-ninth Day of July 1975

[SEAL]

Attest:

RUTH C. MASON
Attesting Officer

C. MARSHALL DANN
Commissioner of Patents and Trademarks